May 15, 1934. J. L. BAIRD Re. 19,169

METHOD OF AND MEANS FOR TRANSMITTING SIGNALS

Original Filed Oct. 7, 1927

INVENTOR

By John L. Baird,

Watson, Cole, Morse & Grindle

Attys.

Reissued May 15, 1934 Re. 19,169

UNITED STATES PATENT OFFICE 19,169

METHOD OF AND MEANS FOR TRANSMITTING SIGNALS

John Logie Baird, London, England, assignor to Television Limited, London, England, a British company Original No. 1,781,799, dated November 18, 1930, Serial No. 224,711, October 7, 1927. Application for reissue September 9, 1931, Serial No. 561,970. In Great Britain October 15, 1926

6 Claims. (Cl. 178—6)

This invention is for an improved method of and means for transmitting signals. Signals may be used for any purpose, including the transmission of pictures for television by methods involving the exploring of the picture and transmission of a series of appropriate signals derived therefrom.

According to the present invention the method of transmitting signals is characterized by using non-visible radiation as the medium of transmission. By non-visible radiation is meant radiations of a wave-length adjacent to that of the visible spectrum, but outside it or in other words the light ordinarily described as infra-red or ultra-violet light.

This invention also provides means for seeing an object in darkness, in which case the invention comprises the combination with an object from which non-visible radiation is emitted or reflected, of a device that is sensitive to such radiation and correspondingly therewith controls an electric current, an exploring mechanism whereby said device explores the object or an image thereof, and a receiving apparatus comprising a luminous source of light controlled by the said device whereby a visible image of the object is provided.

This invention may also be used for the remote control of any desired device and in this case it comprises means for transmitting signals invisibly, comprising at the transmitting station a source of non-visible radiation, means for uniformly interrupting such radiation, and means for varying or interrupting such radiation at will, and at the receiving station there is provided a device which is sensitive to the said radiation and which thereby controls an electric current together with a relay or amplifier which receives said electric current and operates any desired apparatus.

Figure 1:
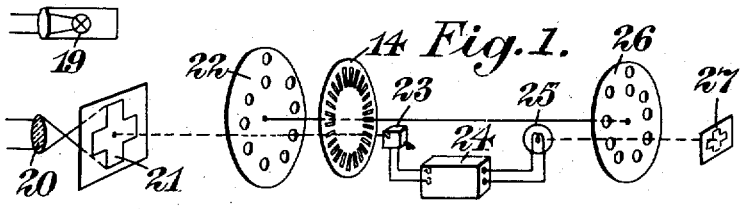

In one arrangement of using this invention for seeing in darkness, as illustrated in Figure 1 of the accompanying drawing, the apparatus is of the type used in television systems.

A "lamp" 19 or suitable source of the selected non-visible radiation is arranged to project a beam upon the object which is to be viewed and an invisible image of this object is provided at 21 by a lens 20 or equivalent device. This image is explored by a spiral of lenses on a rotating disc 22 or other suitable device operating in conjunction with a photo-electric cell 23 which is sensitive to the selected radiation. The current from this cell is passed to an amplifier 24 and thence to a glow-discharge or other suitable lamp 25 which operates in conjunction with a suitable exploring device 26 to produce a visible image say on a screen 27. The two exploring devices 22, 26 are mounted on the same rotating shaft so that their synchronous running is ensured under all conditions.

Figure 2:
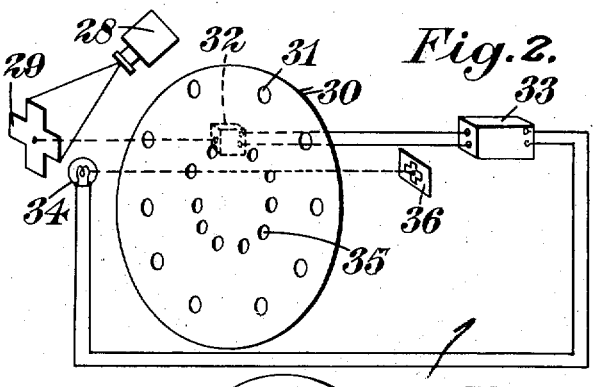

Another construction according to the invention is shown diagrammatically in Figure 2. A "lamp 28" or suitable source of the selected non-visible radiation projects a beam upon the object 29 which is to be viewed. An exploring device consisting of a rotatable disc 30, having a spiral set 31 of lenses or holes is used in combination with a device 32 sensitive to the selected non-visible radiation. A current from the device 32 is amplified by an amplifier 33 and connected to a glow lamp 34 so that the visible light emitted thereby is controlled by the varying current received from the amplifier. This lamp 34 operates in conjunction with an exploring device consisting of a second spiral set 35 of lenses or holes mounted on the disc 30 concentrically arranged and disposed thereon with the first mentioned set 31 and having the holes or lenses of the second set 35 disposed on the same radii respectively as those of the first set 31, thus providing a visible image 36 of the object 29.

Figure 3:
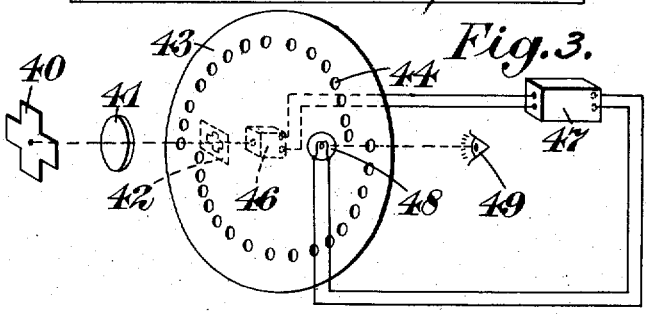

In Figure 3 there is diagrammatically illustrated a modification of the above described construction. In this figure the object illustrated at 40 is "illuminated" by selected non-visible radiation from a source (not shown in the figure) and a lens 41 projects an image 42 on to the outer part of a rotating disc 43. The rotating disc 43 is provided with two sets 44 and 45 of spirally arranged holes each of which extends half way round the disc, the spirals thus being arranged in sequence (as shown in Figure 3). These sets of holes 44, 45 act as an exploring device in combination with a device 46 sensitive to the selected non-visible radiation. The varying current from this device 46 is passed through an amplifier 47 to control the visible light emitted from a lamp 48. The lamp 48 is located on the same side of the disc 43 as the lens 41, diametrically opposite thereto in operative relationship with the spirals 44, 45. Thus an observer 49 on the opposite side of the disc 43 to the lamp 48 will, owing to the cooperation of the lamp and the spirals, see a reproduced visible image of the object 40.

Figure 4:
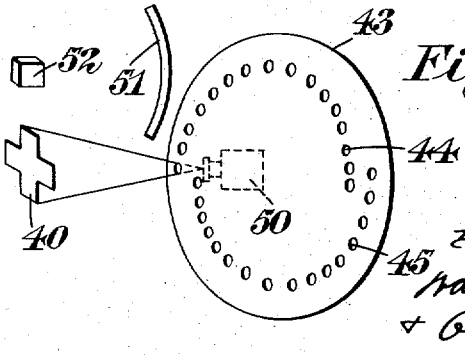

Figure 4 illustrates a further modification of the above construction wherein the object 40 is on one side of the disc 43 and a source 50 of selected non-visible radiation is located on the other side so that a beam of non-visible radiation is traversed over the object 40. The non-visible radiation is reflected from the object on to a concave mirror 51 which concentrates it on a device 52 sensitive to such radiation. The device 52 is connected to a suitable amplifying device and a visible image is produced in the manner hereinbefore described.

It will be appreciated that when infra-red radiation is used in accordance with this invention the "optional" system may comprise lenses of glass or other material which are transparent to such radiation, but when ultra-violet radiation is used it will be necessary to use quartz or like lenses which are transparent to the particular wave length selected.

When this invention is used for remote control of any desired apparatus, there is provided a bolometer or other device sensitive to such radiation, and this device is so arranged that the invisible light, if projected as a beam from the transmitting station, will fall upon it, or if a broadcast radiation is emitted, that it can receive such radiation. The sensitive cell or equivalent device is connected in a suitable electric circuit, with a relay or an amplifier or both, so that its output, as controlled by the radiations, can be used to operate any desired apparatus. This operation may be effected either directly or by operating suitable switches in an electric circuit.

It is important that the radiation which is used for effecting the remote control should be interrupted, as the intermittent impulses thereof which impinge on the sensitive receiving device are more readily controllable and rendered operative, by amplification, in that device. If desired, the interruption may be performed at the receiver, instead of or in addition to that at the transmitter.

Having described my invention, what I claim as new and desire to secure by Letters Patent, is:

1. In apparatus of the class described, in combination, means for directing rays of non-visible frequencies against an object, a light sensitive device sensitive to such rays and arranged adjacent said object for producing a modulated electric current, scanning means disposed between said object and device, a source of illumination operatively coupled with said device and acting in response to the impulses transmitted thereby, and exploring means forming an integral part of said scanning means and disposed adjacent said source of illumination.

2. In apparatus of the class described, in combination, means for directing rays of non-visible frequencies against an object, a light sensitive device sensitive to such rays and arranged adjacent said object for producing a modulated electric current, scanning means disposed between said object and device, a source of illumination operatively coupled with said device and acting in response to the impulses transmitted thereby, and exploring means comprising a rotatable member formed with openings, said scanning means also forming a part of said member.

3. In apparatus of the class described, in combination, means for directing rays of non-visible frequencies against an object, a light sensitive device sensitive to such rays and arranged adjacent said object for producing a modulated electric current, scanning means disposed between said object and device, a source of illumination operatively coupled with said device and acting in response to the impulses transmitted thereby, and exploring means comprising a rotatable member formed with a series of tangentially extended openings, said scanning means being also embodied in said member and comprising a similar series of openings.

4. In apparatus of the class described, in combination, means for directing rays of non-visible frequencies against an object, a light sensitive device sensitive to such rays and arranged adjacent said object for producing a modulated electric current, scanning means disposed between said object and device, a source of illumination operatively coupled with said device and acting in response to the impulses transmitted thereby, and exploring means comprising a rotatable member formed with a series of tangentially extending openings, said scanning means being also embodied in said member and comprising a similar series of openings, one series of such openings terminating adjacent the beginning of the other series.

5. In apparatus of the class described, in combination, means for directing rays of non-visible frequencies against an object, a light sensitive device sensitive to such rays and arranged adjacent said object for producing a modulated electric current, scanning means disposed between said object and device, a source of illumination operatively coupled with said device and acting in response to the impulses transmitted thereby and exploring means comprising a rotatable member formed with a series of tangentially extending openings, said scanning means being also embodied in said member and comprising a similar series of openings, one series of such openings terminating adjacent the beginning of the other series, and each of said series extending throughout substantially 180 degrees only of said member.

6. In apparatus of the class described, the combination with a light sensitive device for producing a modulated electric current when subjected to the action of infra-red radiation of varying intensity, of means for projecting infra-red rays on an object, means for scanning the object by said device, a source of illumination associated with said device and operable by said modulated current, and exploring means associated with said source of illumination, said scanning and exploring means being integrally formed.

JOHN LOGIE BAIRD.